(12) United States Patent
Chifor et al.

(10) Patent No.: US 11,637,810 B2
(45) Date of Patent: Apr. 25, 2023

(54) LINK-LAYER AUTHENTICATION FOR LEGACY NETWORK NODES USING A REMOTE NETWORK ACCESS SERVER

(71) Applicant: LENOVO Enterprise Solutions (Singapore) PTE. LTD., New Tech Park (SG)

(72) Inventors: Bogdan Chifor, Nojorid (RO); George-Andrei Stanescu, Ilfov (RO); Radu Iorga, Bucharest (RO); Corneliu-Ilie Calciu, Bucharest (RO)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 369 days.

(21) Appl. No.: 16/913,346

(22) Filed: Jun. 26, 2020

(65) Prior Publication Data

US 2021/0409373 A1    Dec. 30, 2021

(51) Int. Cl.
*H04L 9/40*  (2022.01)
*G06F 9/455*  (2018.01)
(Continued)

(52) U.S. Cl.
CPC ...... *H04L 63/0245* (2013.01); *G06F 9/45558* (2013.01); *G06F 9/54* (2013.01);
(Continued)

(58) Field of Classification Search
CPC . H04L 63/0245; H04L 63/029; H04L 63/166; H04L 63/205; H04L 63/0892; H04L 63/162; H04L 63/0272; G06F 9/54
See application file for complete search history.

(56) References Cited

U.S. PATENT DOCUMENTS

| 8,584,209 | B1 * | 11/2013 | Borapura | H04L 63/0892 370/254 |
| 2002/0075844 | A1 * | 6/2002 | Hagen | H04L 63/0442 370/328 |

(Continued)

OTHER PUBLICATIONS

Wikipedia, Radius, Remote Authentication Dial-In User Service (RADIUS), dated Nov. 26, 2019, pp. 1-17.
(Continued)

*Primary Examiner* — Robert B Leung
*Assistant Examiner* — Bruce S Ashley
(74) *Attorney, Agent, or Firm* — Kunzler Bean & Adamson; Bruce R. Needham

(57) ABSTRACT

A method for link layer authentication includes receiving, at an edge network access node, a link layer authentication packet from a client, seeking network access, using a remote NAS agent running on the edge network access node. The method transmits, using a tunneling connection, the link layer authentication packet to a remote NAS in a link layer authentication process. The link layer authentication process exchanges the link layer authentication packet with an authentication server to authenticate the client. The method includes receiving a link layer authentication packet from the remote NAS over the tunneling connection. The received link layer authentication packet includes a response from the authentication server regarding the transmitted link layer authentication packet. The method includes transmitting the received link layer authentication packet to the client and, in response to link layer authentication packets resulting authorization, authorizing the client for network access through the edge network access node.

18 Claims, 6 Drawing Sheets

(51) Int. Cl.
*G06F 9/54* (2006.01)
*H04L 67/1097* (2022.01)
(52) U.S. Cl.
CPC .......... *H04L 63/029* (2013.01); *H04L 63/166* (2013.01); *H04L 63/205* (2013.01); *H04L 67/1097* (2013.01); *G06F 2009/45587* (2013.01); *G06F 2009/45595* (2013.01)

(56) References Cited

U.S. PATENT DOCUMENTS

| | | | |
|---|---|---|---|
| 2003/0169713 A1* | 9/2003 | Luo | H04W 12/35 370/351 |
| 2003/0226017 A1* | 12/2003 | Palekar | H04L 63/0428 713/168 |
| 2009/0055898 A1* | 2/2009 | Kaippallimalil | H04W 12/069 726/3 |
| 2014/0130033 A1* | 5/2014 | Alls | G06F 8/65 717/172 |

OTHER PUBLICATIONS

Juniper Networks, Engineering Simplicity, Junos OS User Access and Authentication Feature Guide, dated Oct. 22, 2019, pp. 1-2902.

* cited by examiner

LINK-LAYER AUTHENTICATION FOR LEGACY NETWORK NODES USING A REMOTE NETWORK ACCESS SERVER

FIELD

The subject matter disclosed herein relates to link layer authorization and more particularly relates to link layer authentication for legacy network nodes using a remote network access server ("NAS").

BACKGROUND

In common methods for a client to receive authorization to access the Internet or other computer network, the client requires authentication from a NAS connected to the client over a local area network ("LAN"). If the NAS accepts the request, the NAS informs the client that it can send traffic. One method for client authentication requires the existence of a link-layer authentication capable NAS in the LAN. This setup has to be replicated for each security controlled network access point.

In a link layer authentication scenario, the NAS intermediates an authentication session between the client and an authentication server. By using a link layer authentication protocol, the client and the NAS must share the same broadcast domain. Legacy link-layer authentication architectures with multiple network access servers have drawbacks, from a hardware cost and device management perspective, such as the network must be equipped with link-layer authentication capable devices and an administrator must maintain this configuration on each NAS.

From a software maintenance perspective, such as patching an authentication solution to mitigate security vulnerabilities, upgrading software is a difficult process if the software runs on a network appliance and this process not entirely controlled by the administrator (although this is vendor dependent). In a link-layer authentication environment, each security controlled network access point is equipped with a NAS device which is configured to communicate with an authentication server, which is expensive. The NAS and the client must also share the same broadcast domain or use a direct network link.

BRIEF SUMMARY

A method for link layer authentication for legacy network nodes using a remote NAS is disclosed. Another method and computer program product also perform the functions of the method. The method includes receiving, at an edge network access node and over a LAN, a link layer authentication packet from a client using a remote NAS agent running on the edge network access node. The link layer authentication packet indicating that the client is seeking network access through the edge network access node. The method includes transmitting, over a network different from the LAN, the link layer authentication packet to a remote NAS for processing in a link layer authentication process. The link layer authentication packet is transmitted to the remote NAS using a tunneling connection and the link layer authentication process exchanges the link layer authentication packet with an authentication server to authenticate the client. The method includes receiving a link layer authentication packet from the remote NAS over the tunneling connection. The received link layer authentication packet includes a response from the authentication server regarding the transmitted link layer authentication packet. The method includes transmitting the received link layer authentication packet to the client and, in response to exchanging link layer authentication packets resulting authorization of the client, authorizing the client for network access through the edge network access node.

Another method for link layer authentication for legacy network nodes using a remote NAS includes receiving, at a remote NAS a link layer authentication packet from an edge network access node connected to a client. The link layer authentication packet is received from a tunnel terminator of a tunneling connection between the remote NAS and the edge network access node. The method includes transmitting the link layer authentication packet to an authentication server as part of a link layer authorization process, receiving a link layer authentication packet from the authentication server, and transmitting the link layer authentication packet received from the authentication server to the edge network access node via the tunneling connection. In response to exchanging link layer authentication packets resulting in authorization of the client by the authentication server, the edge network access node authorizes the client for network access through the edge network access node.

A program product for a remote NAS agent includes a computer readable storage medium and program code. The program code is configured to be executable by a processor to perform operations that include receiving, at an edge network access node and over a LAN, a link layer authentication packet from a client using a remote NAS agent running on the edge network access node. The link layer authentication packet indicating that the client is seeking network access through the edge network access node. The program code is configured to be executable by a processor to perform operations that include transmitting, over a network different from the LAN, the link layer authentication packet to a remote NAS for processing in a link layer authentication process. The link layer authentication packet is transmitted to the remote NAS using a tunneling connection. The link layer authentication process exchanges the link layer authentication packet with an authentication server to authenticate the client.

The program code is configured to be executable by a processor to perform operations that include receiving a link layer authentication packet from the remote NAS over the tunneling connection. The received link layer authentication packet includes a response from the authentication server regarding the transmitted link layer authentication packet. The program code is configured to be executable by a processor to perform operations that include transmitting the received link layer authentication packet to the client and, in response to exchanging link layer authentication packets resulting authorization of the client, authorizing the client for network access through the edge network access node.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
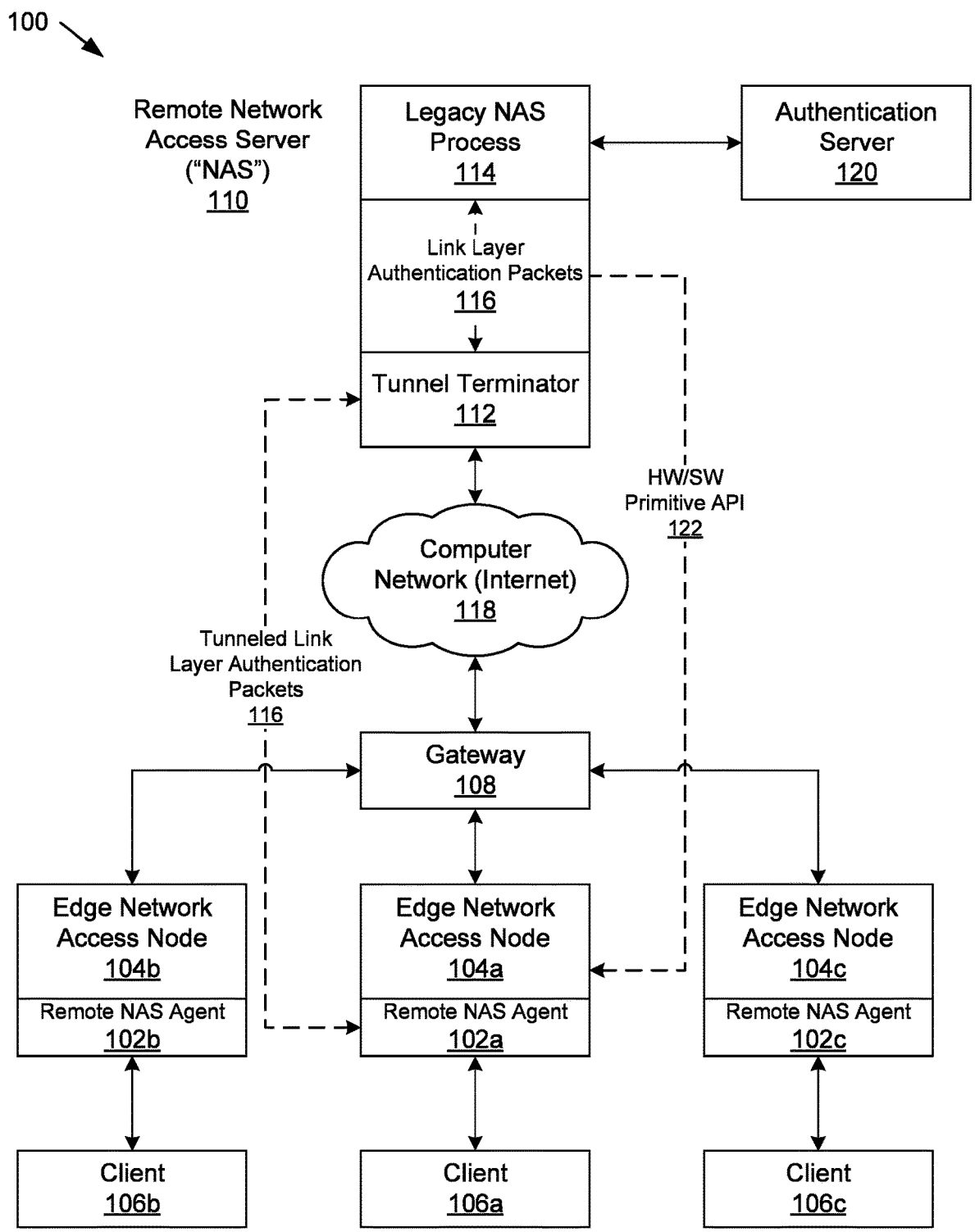
FIG. 1 is a schematic block diagram illustrating one embodiment of a system for link layer authentication for legacy network nodes using a remote network access server ("NAS")

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

A method for link layer authentication for legacy network nodes using a remote NAS is disclosed. Another method and computer program product also perform the functions of the method. The method includes receiving, at an edge network access node and over a LAN, a link layer authentication packet from a client using a remote NAS agent running on the edge network access node. The link layer authentication packet indicating that the client is seeking network access through the edge network access node. The method includes transmitting, over a network different from the LAN, the link layer authentication packet to a remote NAS for processing in a link layer authentication process. The link layer authentication packet is transmitted to the remote NAS using a tunneling connection and the link layer authentication process exchanges the link layer authentication packet with an authentication server to authenticate the client. The method includes receiving a link layer authentication packet from the remote NAS over the tunneling connection. The received link layer authentication packet includes a response from the authentication server regarding the transmitted link layer authentication packet. The method includes transmitting the received link layer authentication packet to the client and, in response to exchanging link layer authentication packets resulting authorization of the client, authorizing the client for network access through the edge network access node.

In some embodiments, the link layer authentication process executing on the remote NAS includes a same link layer authentication process executable on an edge network access node in communication with an authentication server. In other embodiments, the edge network node exchanges link layer authentication packets over a link layer of the LAN. In other embodiments, the remote NAS includes a tunnel terminator that exposes link layer authentication packets transmitted from the edge network access node through the tunneling connection. In other embodiments, the tunneling connection includes a secure connection between the edge network access node and the remote NAS. In a further embodiment, the secure connection includes a Transport Layer Security ("TLS") connection.

In some embodiments, the remote NAS and the authentication server are within a same network domain and the remote NAS is connected to the edge network access node over the Internet. In other embodiments, the edge network access node includes an application programming interface ("API") that allows the remote NAS to control functionality of the edge network access node and the network access node is incapable of running the link layer authorization process without the remote NAS agent. In other embodiments, the remote NAS agent, in response to the authentication server authorizing the client, modifies a hardware table of the edge network access node to authorize the client for network access.

Another method for link layer authentication for legacy network nodes using a remote NAS includes receiving, at a remote NAS a link layer authentication packet from an edge network access node connected to a client. The link layer authentication packet is received from a tunnel terminator of a tunneling connection between the remote NAS and the edge network access node. The method includes transmitting the link layer authentication packet to an authentication server as part of a link layer authorization process, receiving a link layer authentication packet from the authentication server, and transmitting the link layer authentication packet received from the authentication server to the edge network access node via the tunneling connection. In response to exchanging link layer authentication packets resulting in authorization of the client by the authentication server, the edge network access node authorizes the client for network access through the edge network access node.

In some embodiments, the link layer authentication process executing on the remote NAS includes a same link layer authentication process executable on an edge network access node in communication with an authentication server. In other embodiments, the tunneling connection includes a secure connection between the edge network access node and the remote NAS. In other embodiments, the remote NAS and the authentication server are within a same network domain and the remote NAS is connected to the edge network access node over the Internet. In other embodiments, the remote NAS and the authentication server are executing in a same virtual machine.

A program product for a remote NAS agent includes a computer readable storage medium and program code. The program code is configured to be executable by a processor to perform operations that include receiving, at an edge network access node and over a LAN, a link layer authentication packet from a client using a remote NAS agent running on the edge network access node. The link layer authentication packet indicating that the client is seeking network access through the edge network access node. The program code is configured to be executable by a processor to perform operations that include transmitting, over a network different from the LAN, the link layer authentication packet to a remote NAS for processing in a link layer authentication process. The link layer authentication packet is transmitted to the remote NAS using a tunneling connection. The link layer authentication process exchanges the link layer authentication packet with an authentication server to authenticate the client.

The program code is configured to be executable by a processor to perform operations that include receiving a link layer authentication packet from the remote NAS over the tunneling connection. The received link layer authentication packet includes a response from the authentication server regarding the transmitted link layer authentication packet. The program code is configured to be executable by a processor to perform operations that include transmitting the received link layer authentication packet to the client and, in response to exchanging link layer authentication packets resulting authorization of the client, authorizing the client for network access through the edge network access node.

In some embodiments, the link layer authentication process executing on the remote NAS includes a same link layer authentication process executable on an edge network access node in communication with an authentication server. In other embodiments, the edge network node exchanges link layer authentication packets over a link layer of the LAN. In other embodiments, the tunneling connection includes a secure connection between the edge network access node and the remote NAS. In other embodiments, the edge network access node includes an API comprising and the network access node is incapable of running the link layer authorization process without the remote NAS agent. In other embodiments, the program code is configured to be executable by a processor to perform operations that include the remote NAS agent, in response to the authentication server authorizing the client, modifying a hardware table of the edge network access node to authorize the client for network access.

FIG. 1 is a schematic block diagram illustrating one embodiment of a system 100 for link layer authentication for legacy network nodes using a remote NAS 110. The system 100 includes remote NAS agents 102a, 102b, 102c (collectively or generically "102"), in edge network access nodes 104a, 104b, 104c (collectively or generically "104"), clients 106a, 106b, 106c (collectively or generically "106"), a gateway 108, a remote NAS 110 with a tunnel terminator 112, a legacy NAS process 114 communicating link layer authentication packets 116, a computer network 118, an authentication server 120 and a hardware/software primitive application programming interface ("API") connection 122, which are described below.

The system 100 includes remote NAS agents 102 in edge network access nodes 104 that are connected to clients 106. The remote NAS agents 102 enable link layer authentication of the clients 106 using legacy edge network access nodes 104 where the edge network access nodes 104 are not required to be able to execute a full link layer authentication protocol. The remote NAS agents 102 communicate with a remote NAS 110 securely using a tunneling process. The remote NAS 110 is in communication with an authentication server 120. The remote NAS agents 102 are discussed in more detail below with regard to the apparatus 200 of FIG. 2.

The edge network access nodes 104 enable the clients 106 to access other computing devices through the computer network 118, which may include the Internet. Typically, the edge network access nodes 104 are routers where the clients 106 are connected using a local area network ("LAN"). In some embodiments, the edge network access nodes 104 are in contact with a gateway 108, such as an Internet Service Provider ("ISP"), which allows Internet/computer network 118 access. In other embodiments, the edge network access nodes 104 are connected directly to a computer network 118, such as a private LAN, wide area network ("WAN"), etc.

Often, edge network access nodes 104 that are fully capable of executing a link layer authentication protocol are expensive and legacy edge network access nodes 104 may lack a capability to execute a link layer authentication protocol. In addition, link layer authentication protocol provides may charge for their services. Moving the link layer authentication process to a remote NAS 110 and edge network access nodes 104 having a remote NAS agent 102 is a less expensive solution than each edge network access node 104 having a link layer authentication protocol capability. In addition, having a centralized remote NAS 110 with remote NAS agents 102 in edge network access nodes 104 centralizes administration of the link layer authentication process.

The edge network access nodes 104 include LAN capabilities to connect clients 106, computing devices and other network accessible devices to each other over a LAN and to external computer networks 118. Typically, the edge network access nodes 104 have an Internet Protocol ("IP") address known to the computer network 118, gateway 108, etc. and the clients 106, computing devices, etc. connected to the LAN of an edge network access node 104 have a local IP address known to the LAN. Typically, the client 106 or other computing device connected to the LAN is used to manage the edge network access node 104 of the LAN. The LAN may include a wired connection, a wireless connection, a fiber optic connection, etc. or a combination of connection types.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

A client 106 is a computing device with network access capabilities and is typically accessed by a user. The client 106 may be a laptop computer, a desktop computer, a smartphone, a tablet computer, a gaming device, etc. The user may use a client 106 to access the Internet or other resources connected to the computer network 118. For security reasons, the client 106 is typically authorized for network access by an authentication server 120 using a link layer authentication protocol. Where a link layer authentication process is successful for a client 106, the client 106 may receive an IP address for network access. For security, until the link layer authentication process is successful, the client 106 is only allowed to send link layer authentication packets 116. Link layer authentication packets 116 are communicated between a client 106 and an edge network access node 104 over a link layer of a LAN. Transmitting link layer authentication packets 116 openly over the Internet/computer network 118 to a remote authentication server 120 poses a security risk.

Where an edge network access node 104 has link layer authentication protocol capabilities, the edge network access node 104 is able to securely communicate with the authentication server 120 to authenticate the client 106. The embodiments described herein allow a legacy NAS process 114 to be moved to a remote NAS 110 so that a remote NAS agent 102 with very limited capabilities can be installed on an edge network access node 104 that is not link layer authentication capable to enable link layer authentication of the client 106 in a secure way.

The gateway 108, as depicted in the system 100, enables access to the computer network 118, which may or may not include the Internet. The gateway 108, in some embodiments, is an ISP router or similar device. In some embodiments, an edge network access node 104 acts as a gateway 108. The computer network 118 may include additional gateways 108, servers, switches, routers, cables, etc. and may include wired connections, wireless connections, a fiber optic network, etc.

The system 100 includes a remote NAS 110 that includes a tunnel terminator 112 and a legacy NAS process 114. The remote NAS 110, in some embodiments, is a computing device, such as a rack mounted server, a desktop computer, a cloud server, etc. In other embodiments, the remote NAS 110 is a virtual server installed on a virtual machine of a computing device, such as a cloud multi-processor computing device that hosts virtual machines. The remote NAS 110 is connected to the computer network 118 and may be connected to the edge network access nodes 104 over the Internet or other computer network or a combination of computer networks.

The legacy NAS process 114 is any link layer authentication process that could be on an edge network access node 104, but is instead installed on the remote NAS 110. The legacy NAS process 114 may be a current state-of-the-art link layer authentication process or may be an older link layer authentication process. The legacy NAS process 114 exchanges link layer authentication packets 116 with a client 106 via the tunnel from the tunnel terminator 112 and the remote NAS agent 102 and exchanges the link layer authentication packets 116 with the authentication server 120 in a secure way.

The tunnel terminator 112 is part of a tunneling process connecting the remote NAS agent 102 to the tunnel terminator 112 for secure data transmission. The remote NAS agent 102, in some embodiments, encrypts link layer authentication packets 116 in another packet for transmission to the tunnel terminator 112 in the remote NAS 110, where the link layer authentication packets 116 are decrypted and transmitted to the legacy NAS process 114, which then transmits the link layer authentication packets 116 to the authentication server 120. The legacy NAS process 114, in some embodiments, exchanges link layer authentication packets 116 with the authentication server 120 using a cryptographic algorithm or other security mechanism appropriate for the connection between the remote NAS 110 and the authentication server 120.

The tunneling process uses a secure process so that the link layer authentication packets 116 are transmitted securely from the remote NAS agent 102 to the tunnel terminator 112. For example, the tunneling process may encrypt link layer authentication packets 116 and encapsulate the encrypted link layer authentication packets 116 in another data packet, such as a user datagram protocol ("UDP") packet. In some embodiments, the tunneling process is implemented using Transport Layer Security ("TLS"), which is a cryptographic protocol designed to provide communications security over a computer network 118. In other embodiments, the tunneling process is implemented using Internet Protocol Security ("IPsec"), another security protocol. One of skill in the art will recognize other appropriate security protocols that may be used in the tunneling process to securely transmit link layer authentication packets 116.

The authentication server 120, in some embodiments, is a credential repository and includes an ability to compare information from link layer authentication packets 116 with credentials to validate a client 106. The authentication server 120, in some embodiments, is on a computing device different than the remote NAS 110 and exchanges link layer authentication packets 116 over a LAN. Where the remote NAS 110 and the authentication server 120 are connected over a LAN, legacy cryptographic algorithms may be used, such as the Remote Authentication Dial In User Service ("RADIUS") MD5 packet integrity verification method. The RADIUS MD5 packet integrity verification method is a hash function producing a 128-bit value. Other legacy cryptographic algorithms may also be used. In some embodiments, the remote NAS 110 and the authentication server 120 are collocated on a same virtual server, which allows usage of legacy cryptographic algorithms and is more secure from attackers. Where the remote NAS 110 and the authentication server 120 are connected over the Internet or other computer network (e.g. 118), more secure data transport methods are required for security and security risks are higher.

In one embodiment, the system 100 includes a hardware/software primitive API connection 122 between the remote NAS 110 and the edge network access server 104. The hardware/software primitive API connection 122 allows the remote NAS 110 to perform various hardware primitives on the edge network access node 104, such as installing and removing packet filters, changing a media access control ("MAC") learning mode, manipulating a Forwarding Database ("FDB"), etc.

Figure 2:
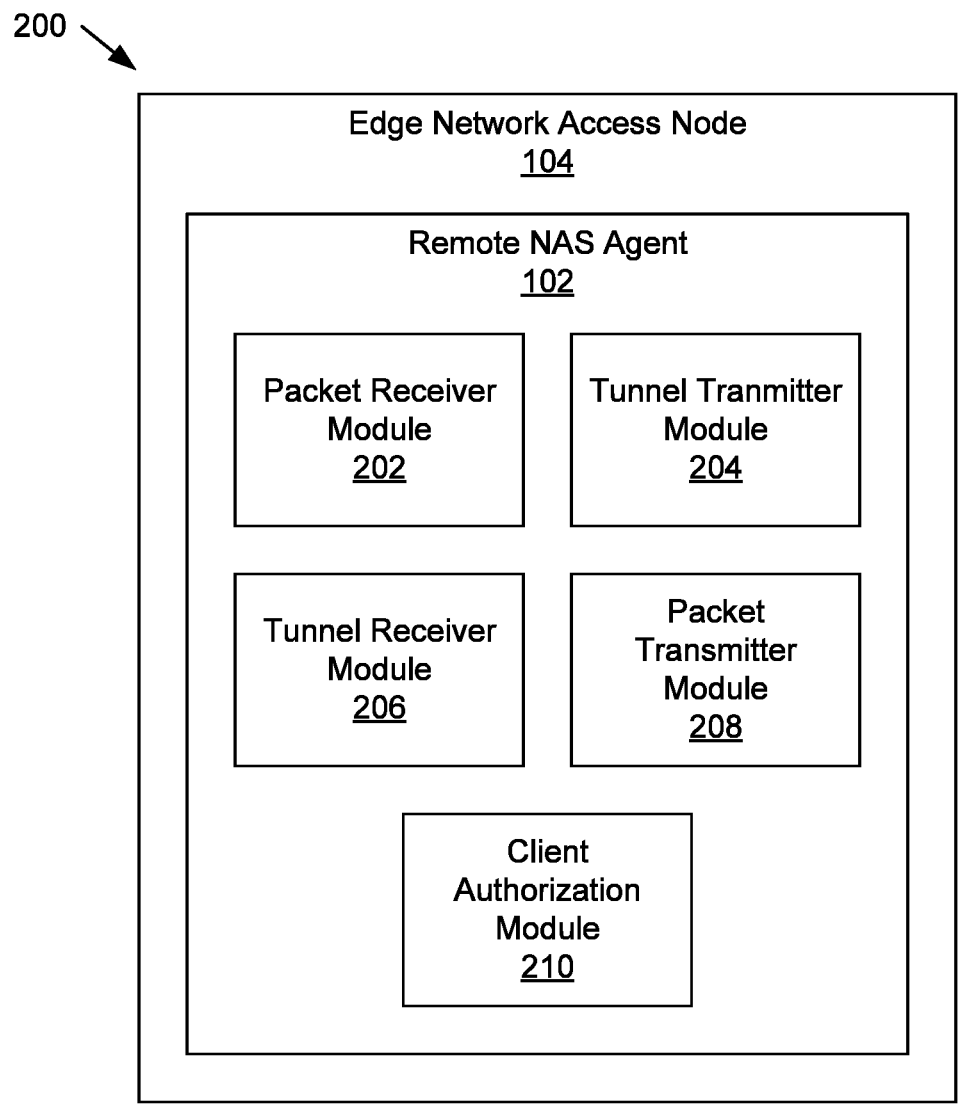
FIG. 2 is a schematic block diagram illustrating one embodiment of an apparatus with a remote NAS agent in an edge network access node.

FIG. 2 is a schematic block diagram illustrating one embodiment of an apparatus 200 with a remote NAS agent 102 in an edge network access node 104. The remote NAS agent 102 includes a packet receiver module 202, a tunnel transmitter module 204, a tunnel receiver module 206, a packet transmitter module 208 and a client authorization module 210, which are described below. In some embodiments, the remote NAS agent 102 is implemented in program code that is executable on a processor of an edge network access node 104. For example, the edge network access node 104 may be a router with a particular router processor and the remote NAS agent 102 may be stored in memory of the router and is designed to be executable on the router processor. In other embodiments, the remote NAS agent 102 is implemented with a programmable hardware device, such as a field programmable gate array ("FPGA"), programmable array logic, or the like. In other embodiments, a portion or all of the remote NAS agent 102 is implemented with hardware circuits, such as in an application specific integrated circuit ("ASIC").

The apparatus 200 includes a packet receiver module 202 that receives, at an edge network access node 104 and over a LAN, a link layer authentication packet 116 from a client 106 using the remote NAS agent 102 running on the edge network access node 104. The link layer authentication packet 116 indicates that the client 106 is seeking network access through the edge network access node 104. The client 106 transmits the link layer authentication packet 116 to the edge network access node 104 over a link layer. Prior to authorization of a client 106, typically the edge network access node 104 ignores any other packets from the client 106 other than link layer packets. The link layer authentication packet 116 is intended for the authentication server 120 and is structured to provide identifying information regarding the client 106 and to be used in a link layer authentication process with the authentication server 120.

The apparatus 200 includes a tunnel transmitter module 204 that transmits, over a network (e.g. 118) different from the LAN, the link layer authentication packet 116 to a remote NAS 110 for processing in a link layer authentication process. The link layer authentication packet 116 is transmitted to the remote NAS 110 using a tunneling connection, which securely transmits the link layer authentication packet 116. The link layer authentication process exchanges the link layer authentication packet 116 with an authentication server 120 to authenticate the client 106. In some embodiments, the tunnel transmitter module 204 encrypts the link layer authentication packet 116 received from the client 106 and then encapsulates the link layer authentication packet 116 in a data packet for transport to the remote NAS 110. The tunnel transmitter module 204 may use TLS, IPsec or other security protocol.

The apparatus 200 includes a tunnel receiver module 206 that receives a link layer authentication packet 116 from the remote NAS 110 over the tunneling connection. For example, the tunnel terminator 112 transmits the link layer authentication packet 116 to the tunnel receiver module 206 in the remote NAS agent 102 of the edge network access node 104. The received link layer authentication packet 116, in some embodiments, is a response from the authentication server 120 regarding the transmitted link layer authentication packet 116 transmitted by the tunnel transmitter module 204. In some embodiments, the tunnel receiver module 206 extracts the encrypted link layer authentication packet 116 from a received data packet. In other embodiments, the tunnel receiver module 206 decrypts the payload of the received data packet that includes the received link layer authentication packet 116. In some embodiments, the remote NAS agent 102 reads the received link layer authentication packet 116 for any instructions pertinent to the edge network access node 104.

The apparatus 200 includes a packet transmitter module 208 that transmits the received link layer authentication packet 116 to the client 106. In some embodiments, the packet transmitter module 208 transmits a decrypted link layer authentication packet 116 to the client 106. In some embodiments, the link layer authentication packet 116 includes authorization of the client 106. In other embodiments, the link layer authentication packet 116 seeks information from the client 106, which then sends another link layer authentication packet 116 to the remote NAS agent 102. In other embodiments, the link layer authentication packet 116 includes information for the client 106.

The apparatus 200 includes a client authorization module 210 that, in response to exchanging link layer authentication packets 116 resulting authorization of the client 106, authorizes the client 106 for network access through the edge network access node 104. In some embodiments, the client authorization module 210 accesses a hardware table in the edge network access node 104 to manipulate hardware and/or software configurations of the edge network access node 104 to allow the client 106 to access the LAN and/or computer network 118.

In some embodiments, the client authorization module 210 and/or remote NAS agent 102 exposes to the remote NAS 110 an API in the remote NAS agent 102 to allow the remote NAS 110 to control some functions in the edge network access node 104 through a hardware/software primitive API connection 122. In some example, the functions are hardware primitive functions, such as install/remove packet filters, change the media access control ("MAC") learning mode or manipulate a Forwarding Database ("FDB") of the edge network access node 104. In some examples, the API exposes to the remote NAS 110 available common functionality of an edge network access node 104 that is not capable of link layer authentication protocol execution. In some embodiments, the client authorization module 210 allows the remote NAS 110, through the API, to add a media access control ("MAC") address of the client 106 to the hardware table to authorize the client 106 for network communication.

The client 106 and authentication server 120, in some embodiments, exchange multiple link layer authentication packets 116. In other embodiments, the legacy NAS process 114 and/or remote NAS 110 communicate with the edge network access node 104 to authorize the client 106 through the remote NAS agent 102 and/or API over a hardware/software primitive API connection 122. One of skill in the art will recognize elements of a link layer authentication protocol and how link layer authentication packets 116 are exchanged to authorize the client 106.

Figure 3:
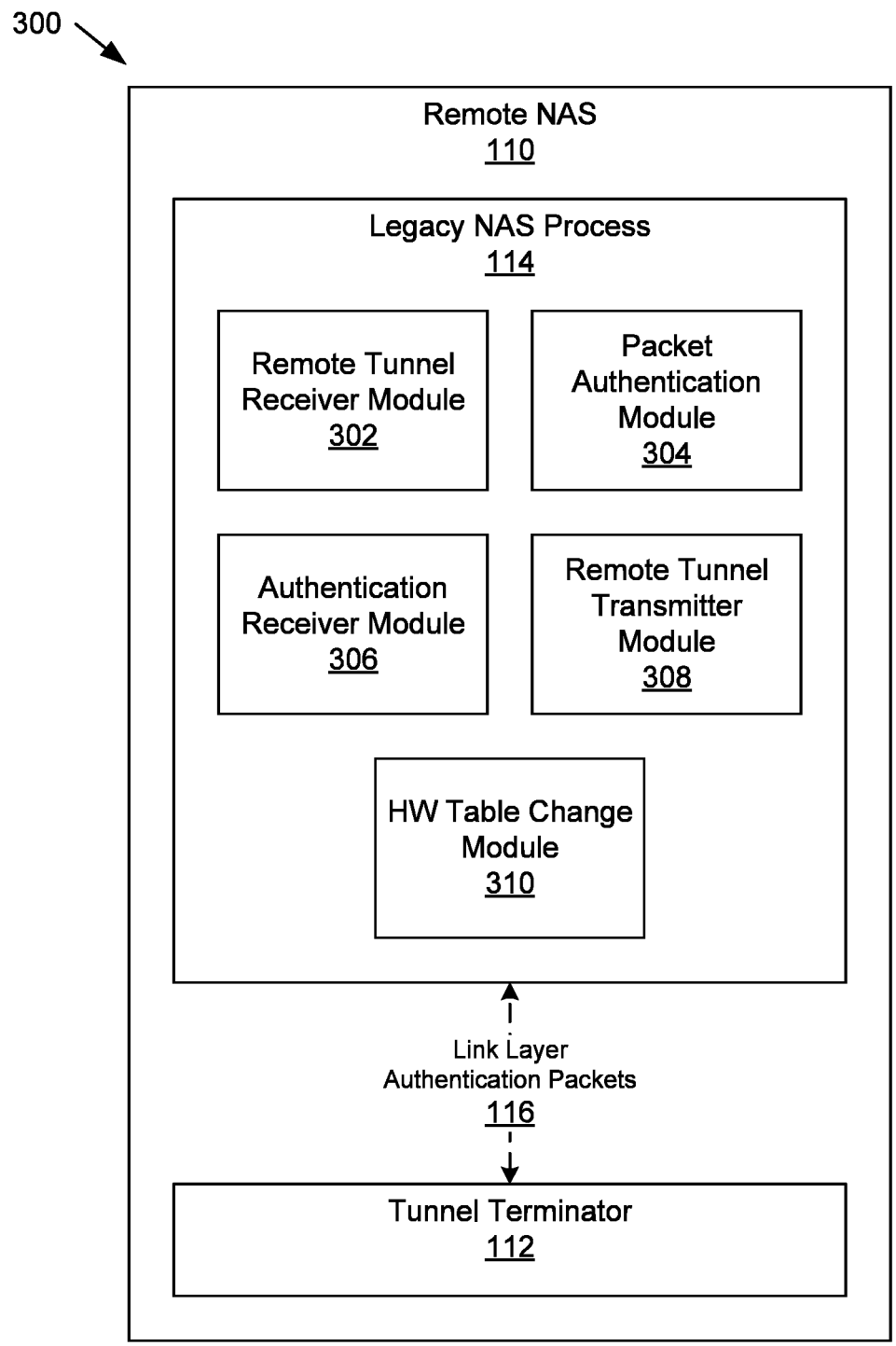
FIG. 3 is a schematic block diagram illustrating one embodiment of an apparatus with a legacy NAS process and a tunnel terminator in a remote NAS.

FIG. 3 is a schematic block diagram illustrating one embodiment of an apparatus 300 with a legacy NAS process 114 and a tunnel terminator 112 in a remote NAS 110. The apparatus 300 includes an embodiment of the remote NAS 110 with a tunnel terminator 112 and a legacy NAS process 114 that includes a remote tunnel receiver module 302, a packet authentication module 304, an authentication receiver module 306, a remote tunnel transmitter module 308 and a hardware table change module 310, which are described below. In some embodiments, the remote NAS 110 is implemented in program code that is executable on a processor. For example, a virtual machine may execute that program code on a processor. In other embodiments, the remote NAS 110 is implemented on a computing device that includes a processor for execution of the program code of the remote NAS 110. In other embodiments, the remote NAS 110 is implemented with a programmable hardware device, such as a field programmable gate array ("FPGA"), programmable array logic, or the like. In other embodiments, a portion or all of the remote NAS 110 is implemented with hardware circuits, such as in an application specific integrated circuit ("ASIC").

The apparatus 300 includes, as part of the legacy NAS process 114, a remote tunnel receiver module 302 that receives, at the remote NAS 110 a link layer authentication packet 116 from an edge network access node 104 connected to a client 106. The link layer authentication packet 116 is received from the tunnel terminator 112 of a tunneling connection between the remote NAS 110 and the edge network access node 104. The tunnel terminator 112, in some embodiments, receives a data packet that includes the link layer authentication packet 116 and forwards on the link layer authentication packet 116 to the remote tunnel receiver module 302 in the legacy NAS process 114. In some embodiments, the link layer authentication packet 116 is the payload of the data packet and the tunnel terminator 112 extracts and decrypts the link layer authentication packet 116 before transmission to the remote tunnel receiver module 302.

The apparatus 300 includes a packet authentication module 304 that transmits the link layer authentication packet 116 to the authentication server 120 as part of a link layer authorization process. The authentication server 120 processes the link layer authentication packet 116, for example, by determining if information from the client 106 matches information in a credential table in the authentication server 120. In some embodiments, the remote NAS 110 and authentication server 120 are in a same broadcast domain and/or trust domain and the packet authentication module 304 and authentication server 120 use an appropriate cryptographic algorithm to securely transmit link layer authentication packets 116 between the remote NAS 110 and the authentication server 120. In other embodiments, the remote NAS 110 and the authentication server 120 are in different broadcast domains and the packet authentication module 304 and authentication server 120 use a more secure cryptographic algorithm, such as TLS.

The apparatus 300 includes an authentication receiver module 306 that receives a link layer authentication packet 116 from the authentication server 120. Typically, the link layer authentication packet 116 received by the authentication receiver module 306 and the link layer authentication packet 116 sent by the packet authentication module 304 are different because the link layer authentication packet 116 received by the authentication receiver module 306 is a response from the authentication server 120 to the link layer authentication packet 116 transmitted by the packet authentication module 304.

The apparatus 300 includes a remote tunnel transmitter module 308 that transmits the link layer authentication packet 116 received from the authentication server 120 to the edge network access node 104 via the tunneling connection. For example, the remote tunnel transmitter module 308 transmits the link layer authentication packet 116 received from the authentication server 120 to the tunnel terminator 112, which encrypts the link layer authentication packet 116 and encapsulates the encrypted link layer authentication packet 116 as a data packet for transmission to the remote NAS agent 102 in the edge network access node 104. The remote NAS agent 102 then extracts and decrypts the link layer authentication packet 116 for processing and/or transmission to the client 106.

The apparatus 300 includes a hardware table change module 310 that, in response to exchanging link layer authentication packets 116 resulting in authorization of the client 106 by the authentication server 120, the edge network access node 104 authorizes the client 106 for network access through the edge network access node 104. In some embodiments, the hardware table change module 310 accesses an API in the remote NAS agent 102 over a hardware/software primitive API connection 122 to change a hardware table and/or execute other functions in the edge network access node 104 to authorize the client 106 for network access.

Figure 4:
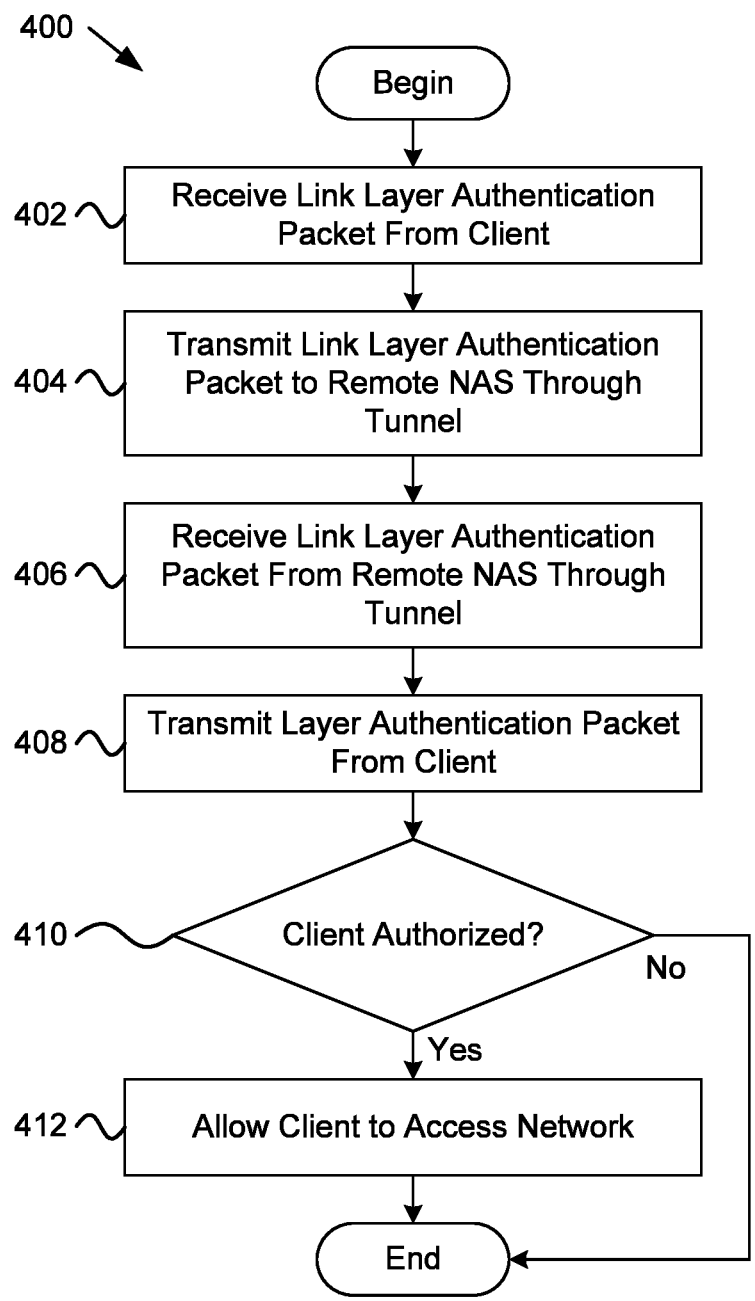
FIG. 4 is a schematic flow chart diagram illustrating one embodiment of a method for link layer authentication at a remote NAS agent for legacy network nodes using a remote NAS.

FIG. 4 is a schematic flow chart diagram illustrating one embodiment of a method 400 for link layer authentication at a remote NAS agent 102 for legacy network nodes using a remote NAS 110. The method 400 begins and receives 402, at an edge network access node 104, a link layer authentication packet 116 from a client 106 over a LAN. In some embodiments, the method 400 uses a remote NAS agent 102 running on the edge network access node 104. The client 106 is seeking network access through the edge network access node 104.

The method 400 transmits 404, over a network different from the LAN, the link layer authentication packet 116 to a remote NAS 110 for processing in a link layer authentication process. The link layer authentication packet 116 is transmitted to the remote NAS 110 using a tunneling connection. In some embodiments, the method 400 encrypts the link layer authentication packet 116 and encapsulates the link layer authentication packet 116 in a data packet prior to transmission 404. The link layer authentication process exchanges the link layer authentication packet 116 with an authentication server 120 to authenticate the client 106. The method 400 receives 406 a link layer authentication packet 116 from the remote NAS 110 over the tunneling connection. The received link layer authentication packet 116 is a response from the authentication server 120 regarding the transmitted link layer authentication packet 116.

The method 400 transmits 408 the received link layer authentication packet 116 to the client 106. The authentication server 120 determines if the client 106 is authorized based on exchange of link layer authentication packets 116. In in response to the method 400 determining 410, from the authentication server 120, that exchanging link layer authentication packets 116 results in authorization of the client 106 by the authentication server 120, the method 400 allows 412 the client 106 access to the computer network 118 and/or LAN, and the method 400 ends. In response to the method 400 determining 410, from the authentication server 120, that exchanging link layer authentication packets 116 has not resulted in authorization of the client 106 by the authentication server 120, the method 400 ends. For example, the method 400 might notify a user through the edge network access node 104, a system administrator through the remote NAS 110, etc. that the link layer authentication process has failed. In various embodiments, the method 400 is implemented with the packet receiver module 202, the tunnel transmitter module 204, the tunnel receiver module 206, the packet transmitter module 208 and/or the client authorization module 210.

Figure 5:
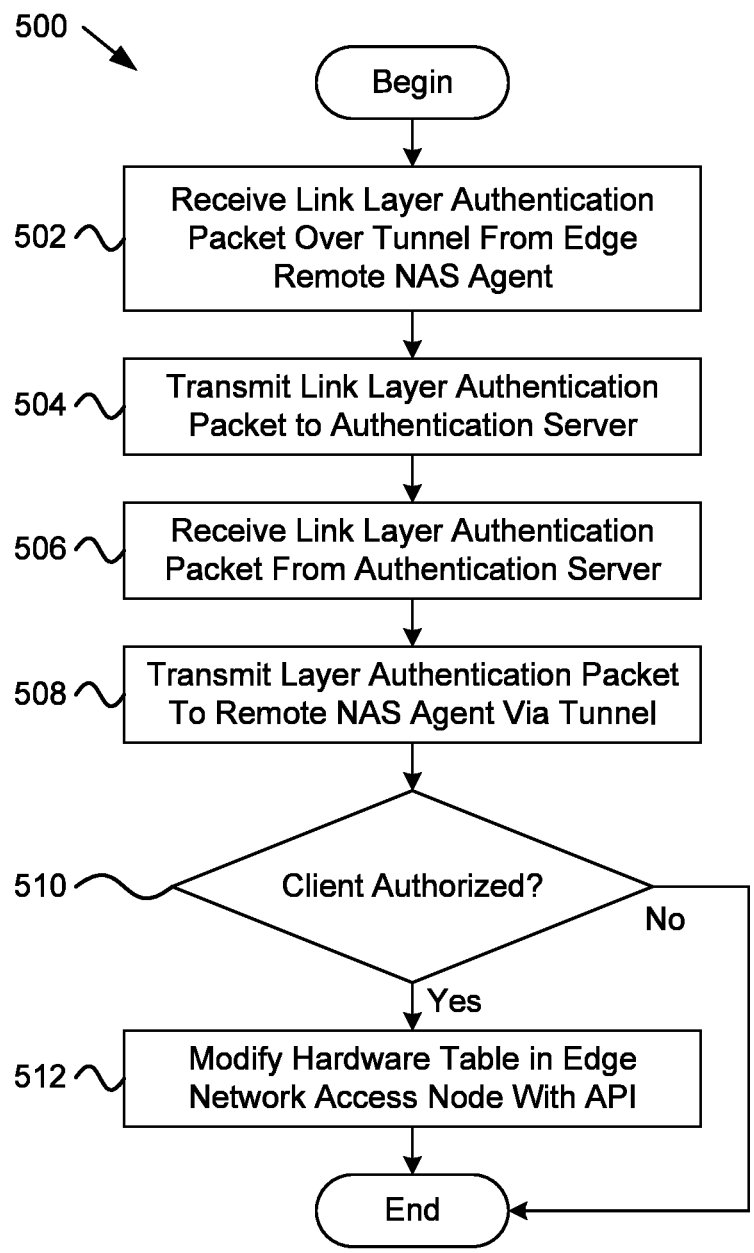
FIG. 5 is a schematic flow chart diagram illustrating one embodiment of a method for link layer authentication for legacy network nodes at a remote NAS.

FIG. 5 is a schematic flow chart diagram illustrating one embodiment of a method 500 for link layer authentication for legacy network nodes at a remote NAS 110. The method 500 begins and receives 502, at a remote NAS 110 a link layer authentication packet 116 from an edge network access node 104 connected to a client 106. The link layer authentication packet 116 is received from a tunnel terminator 112 of a tunneling connection between the remote NAS 110 and the edge network access node 104. The method 500 transmits 504 the link layer authentication packet 116 to an authentication server 120 as part of a link layer authorization process and then receives 506 a link layer authentication packet 116 from the authentication server 120. The received link layer authentication packet 116 from the authentication server 120, in some embodiments, is a response to the link layer authentication packet 116 transmitted 504 to the authentication server 120.

The method 500 transmits 508 the link layer authentication packet 116 received from the authentication server 120 to the edge network access node 104 via the tunneling connection. The authentication server 120 determines if the client 106 is authorized based on exchange of link layer authentication packets 116. In in response to the method 500 determining 510, from the authentication server 120, that exchanging link layer authentication packets 116 results in authorization of the client 106 by the authentication server 120, the method 500 modifies 512 a hardware table in the edge network access node 104 to authorize the client 106 for network access through the edge network access node 104, and the method 500 ends. In response to the method 500 determining 510, from the authentication server 120, that exchanging link layer authentication packets 116 has not resulted in authorization of the client 106 by the authentication server 120, the method 500 ends. The method 500 may also include notifying a user and/or system administrator regarding authorization or non-authorization of the client 106. In various embodiments, the method 500 is implemented with the remote tunnel receiver module 302, the packet authentication module 304, the authentication receiver module 306, the remote tunnel transmitter module 308 and/or the hardware table change module 310.

Figure 6:
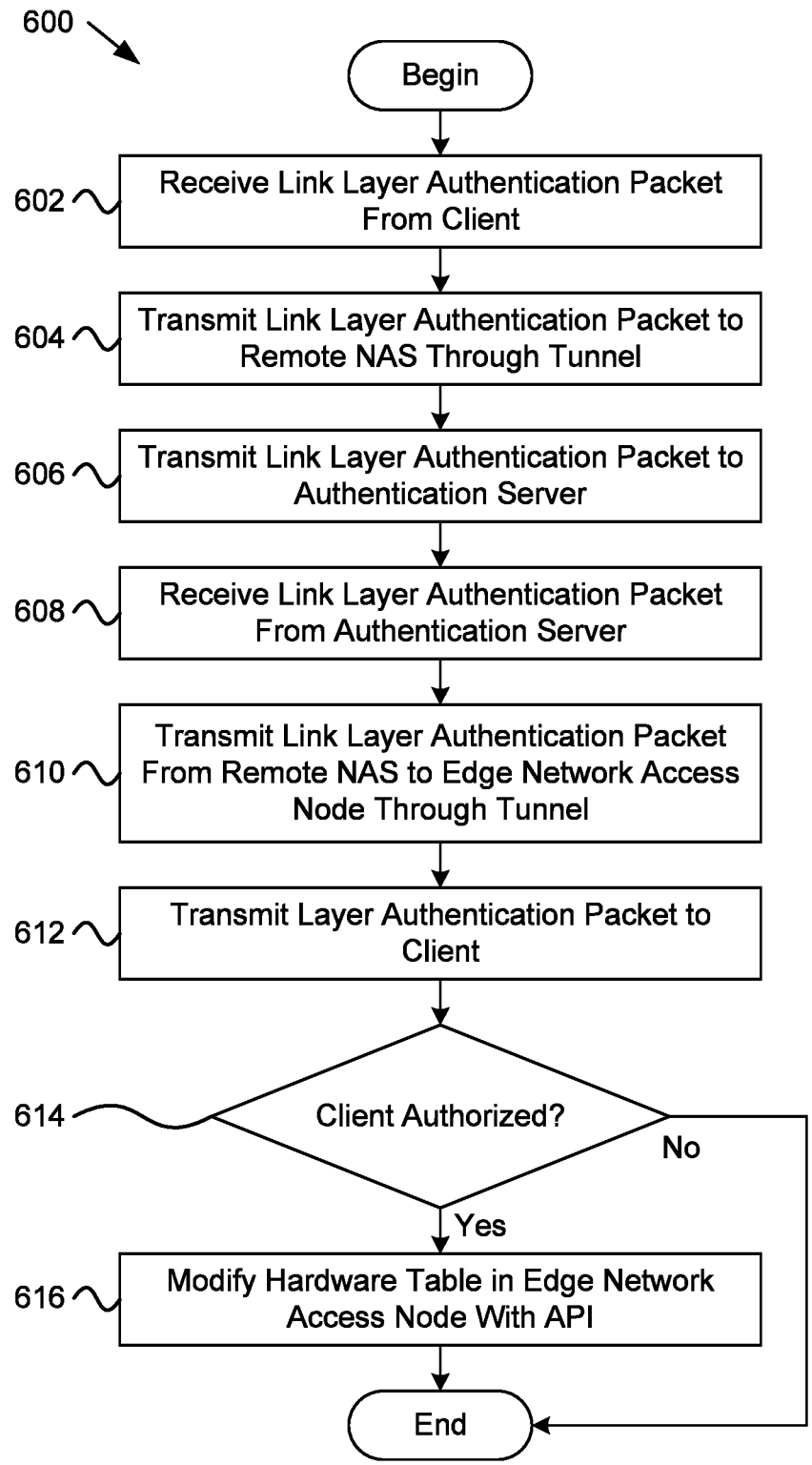
FIG. 6 is a schematic flow chart diagram illustrating one embodiment of a method for link layer authentication for legacy network nodes with a remote NAS agent in communication with a remote NAS.

FIG. 6 is a schematic flow chart diagram illustrating one embodiment of a method 600 for link layer authentication for legacy network nodes with a remote NAS agent 102 in communication with a remote NAS 110. The method 600 is an overall link layer authentication process involving a remote NAS 110 and a remote NAS agent 102 in an edge network access node 104. The method 600 begins and receives 602, at the edge network access node 104 and over a LAN, a link layer authentication packet 116 from a client 106 using a remote NAS agent 102 running on the edge network access node 104. The client 106 is seeking network access through the edge network access node 104. The method 600 transmits 604, over a network different from the LAN (e.g. the computer network 118), the link layer authentication packet 116 to the remote NAS 110 for processing in a link layer authentication process. The method 600 encrypts and encapsulates the link layer authentication packet 116 before transmission 604 to the remote NAS 110. The link layer authentication packet 116 is transmitted 604 to the remote NAS 110 using the tunneling connection.

The method 600 transmits 606 the link layer authentication packet 116 to an authentication server 120 as part of the link layer authorization process. The method 600 receives 608 a link layer authentication packet 116 from the authentication server 120. The link layer authentication packet 116 received 608 from the authentication server 120, in some embodiments, is a response to the link layer authentication packet 116 transmitted 604 to the authentication server 120. The method 600 transmits 610 the link layer authentication packet 116, received 608 from the authentication server 120, to the edge network access node 104 via the tunneling connection. In some embodiments, the method 600 un-encapsulates and decrypts a data packet with the link layer authentication packet 116. The method 600 transmits 612 the link layer authentication packet 116 to the client 106.

The authentication server 120 determines if the client 106 is authorized based on exchange of link layer authentication packets 116. In in response to the method 600 determining 614, from the authentication server 120, that exchanging link layer authentication packets 116 results in authorization of the client 106 by the authentication server 120, the method 600 modifies 616 a hardware table in the edge network access node 104 to authorize the client 106 for network access through the edge network access node 104, and the method 600 ends. In in response to the method 600 determining 614, from the authentication server 120, that exchanging link layer authentication packets 116 has not resulted in authorization of the client 106 by the authentication server 120, the method 600 ends. In various embodiments, the method 600 is implemented with one or more of the packet receiver module 202, the tunnel transmitter module 204, the tunnel receiver module 206, the packet transmitter module 208 the client authorization module 210, the remote tunnel receiver module 302, the packet authentication module 304, the authentication receiver module 306, the remote tunnel transmitter module 308 and the hardware table change module 310.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, at an edge network access node and over a local area network ("LAN"), a link layer authentication packet from a client using a remote network access server ("NAS") agent running on the edge network access node, the link layer authentication packet indicating that the client is seeking network access through the edge network access node;
transmitting, with a tunnel transmitter module and over a network different from the LAN, the link layer authentication packet to a remote NAS for processing in a link layer authentication process, wherein the link layer authentication packet is transmitted to the remote NAS using a tunneling connection, wherein the link layer authentication process exchanges the link layer authentication packet with an authentication server to authenticate the client;
receiving, with a tunnel receiver module, a link layer authentication packet from the remote NAS over the tunneling connection, the received link layer authentication packet comprising a response from the authentication server regarding the transmitted link layer authentication packet;
transmitting the received link layer authentication packet to the client; and
in response to exchanging link layer authentication packets resulting in authorization of the client, authorizing, with a client authorization module, the client for network access through the edge network access node,
wherein the edge network access node comprises an application programming interface ("API") that allows the remote NAS to control at least some functionality of the edge network access node and the edge network access node is incapable of running a link layer authorization process without the remote NAS agent.

2. The method of claim 1, wherein the link layer authentication process executing on the remote NAS comprises a same link layer authentication process executable on an edge network access node in communication with an authentication server.

3. The method of claim 1, wherein the edge network access node exchanges link layer authentication packets over a link layer of the LAN.

4. The method of claim 1, wherein the remote NAS comprises a tunnel terminator that exposes link layer authentication packets transmitted from the edge network access node through the tunneling connection.

5. The method of claim 1, wherein the tunneling connection comprises a secure connection between the edge network access node and the remote NAS.

6. The method of claim 5, wherein the secure connection comprises a Transport Layer Security ("TLS") connection.

7. The method of claim 1, wherein the remote NAS and the authentication server are within a same network domain and wherein the remote NAS is connected to the edge network access node over an Internet.

8. The method of claim 1, wherein the remote NAS agent, in response to the authentication server authorizing the client, modifies a hardware table of the edge network access node to authorize the client for network access.

9. A method comprising:
receiving, via a remote tunnel receiver module at a remote network access server ("NAS") a link layer authentication packet from a remote NAS agent running on an edge network access node connected to a client, the link layer authentication packet received from a tunnel terminator of a tunneling connection between the remote NAS and the remote NAS agent running on the edge network access node;
transmitting the link layer authentication packet to an authentication server as part of a link layer authorization process;
receiving a link layer authentication packet from the authentication server; and
transmitting, via a remote tunnel transmitter module, the link layer authentication packet received from the authentication server to the edge network access node via the tunneling connection,
wherein in response to exchanging link layer authentication packets resulting in authorization of the client by the authentication server, the edge network access node authorizes the client for network access through the edge network access node,
wherein the edge network access node comprises an application programming interface ("API") that allows the remote NAS to control at least some functionality of the edge network access node and the edge network access node is incapable of running a link layer authorization process without the remote NAS agent.

10. The method of claim 9, wherein the link layer authentication process executing on the remote NAS comprises a same link layer authentication process executable on an edge network access node in communication with an authentication server.

11. The method of claim 9, wherein the tunneling connection comprises a secure connection between the edge network access node and the remote NAS.

12. The method of claim 9, wherein the remote NAS and the authentication server are within a same network domain and wherein the remote NAS is connected to the edge network access node over an Internet.

13. The method of claim 12, wherein the remote NAS and the authentication server are executing in a same virtual machine.

14. A program product for a remote network access server ("NAS") agent comprising a non-transitory computer readable storage medium and program code, the program code being configured to be executable by a processor to perform operations comprising:
receiving, at an edge network access node and over a local area network ("LAN"), a link layer authentication packet from a client using a remote network access server ("NAS") agent running on the edge network access node, the link layer authentication packet indicating that the client is seeking network access through the edge network access node;
transmitting, with a tunnel transmitter module and over a network different from the LAN, the link layer authentication packet to a remote NAS for processing in a link layer authentication process, wherein the link layer authentication packet is transmitted to the remote NAS using a tunneling connection, wherein the link layer authentication process exchanges the link layer authentication packet with an authentication server to authenticate the client;

receiving, with a tunnel receiver module, a link layer authentication packet from the remote NAS over the tunneling connection, the received link layer authentication packet comprising a response from the authentication server regarding the transmitted link layer authentication packet;

transmitting the received link layer authentication packet to the client; and in response to exchanging link layer authentication packets resulting in authorization of the client, authorizing, with a client authorization module, the client for network access through the edge network access node, wherein the edge network access node comprises an application programming interface ("API") that allows the remote NAS to control at least some functionality of the edge network access node and the edge network access node is incapable of running a link layer authorization process without the remote NAS agent.

15. The program product of claim 14, wherein the link layer authentication process executing on the remote NAS comprises a same link layer authentication process executable on an edge network access node in communication with an authentication server.

16. The program product of claim 14, wherein the edge network access node exchanges link layer authentication packets over a link layer of the LAN.

17. The program product of claim 14, wherein the tunneling connection comprises a secure connection between the edge network access node and the remote NAS.

18. The program product of claim 14, wherein the program code comprising the remote NAS agent, in response to the authentication server authorizing the client, modifies a hardware table of the edge network access node to authorize the client for network access.

* * * * *